United States Patent
Brown et al.

(10) Patent No.: US 7,743,264 B2
(45) Date of Patent: Jun. 22, 2010

(54) METHOD AND SYSTEM OF CONTROLLING OPERATIONAL STATE OF A COMPUTER SYSTEM VIA POWER BUTTON OF A PERIPHERAL DEVICE

(75) Inventors: Norman P. Brown, Tomball, TX (US); George Mandamadiotis, Houston, TX (US); Ronald T. Truong, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 693 days.

(21) Appl. No.: 11/617,901

(22) Filed: Dec. 29, 2006

(65) Prior Publication Data

US 2008/0162950 A1  Jul. 3, 2008

(51) Int. Cl.
G06F 1/00 (2006.01)
G06F 1/26 (2006.01)
G06F 3/00 (2006.01)
G06F 13/42 (2006.01)
G06F 3/038 (2006.01)

(52) U.S. Cl. .................. 713/300; 713/320; 170/15; 170/105; 345/211

(58) Field of Classification Search .................. 713/300, 713/320; 345/211; 710/15, 105
See application file for complete search history.

(56) References Cited

U.S. PATENT DOCUMENTS

| | | | | |
|---|---|---|---|---|
| 5,097,388 | A | * | 3/1992 | Buist et al. ............... 361/679.4 |
| 5,764,547 | A | * | 6/1998 | Bilich et al. ................ 713/321 |
| 6,125,449 | A | | 9/2000 | Taylor et al. |
| 7,173,613 | B2 | * | 2/2007 | Greenwood et al. ......... 345/211 |
| 2002/0126442 | A1 | * | 9/2002 | Lim et al. ................... 361/681 |
| 2005/0078106 | A1 | | 4/2005 | Greenwood et al. |
| 2005/0114716 | A1 | | 5/2005 | O |
| 2006/0119595 | A1 | | 6/2006 | Hsuan et al. |
| 2007/0002347 | A1 | * | 1/2007 | Lai et al. ..................... 358/1.9 |
| 2008/0162956 | A1 | * | 7/2008 | Bozek et al. ................ 713/310 |

FOREIGN PATENT DOCUMENTS

| KR | 10-2003-0023903 | | 3/2003 |
|---|---|---|---|
| KR | 10-2004-0006261 | | 1/2004 |
| KR | 100474638 B1 | * | 3/2005 |

* cited by examiner

Primary Examiner—Stefan Stoynov

(57) ABSTRACT

Methods and systems of controlling power of a computer system. At least some of the illustrative embodiments are methods comprising actuating a power button of a peripheral device coupled to a computer system, sending a message from the peripheral device to the computer system over a message-based communication pathway indicating actuation of the power button, and performing an action by the computer system based on the message.

14 Claims, 3 Drawing Sheets

METHOD AND SYSTEM OF CONTROLLING OPERATIONAL STATE OF A COMPUTER SYSTEM VIA POWER BUTTON OF A PERIPHERAL DEVICE

BACKGROUND

There are separate, and somewhat competing, trends in the computer industry regarding size of computer equipment. On one hand, the diagonal size of display devices (e.g., color liquid crystal displays (LCD)) is increasing, while on the other hand the enclosure size for computer systems is shrinking. Many times computer users, especially home-based users, place the computer system physically behind the display device, effectively hiding the computer system.

However, while placing the computer system physically behind the display device may be aesthetically pleasing, such a placement makes access to the power button on the computer system difficult. Some manufactures have attempted to address power button access difficulties by having a double pole, single throw (DPST) push button on the display device. One set of contacts on the DPST push button performs power control on the display device, while the other set of contacts couple to the computer system over dedicated power control lines and perform power control on the computer system. However, such an arrangement requires a separate, dedicated and non-standard connection between the display device and the computer system to accommodate providing the power-on or power-off signal to the computer system. Moreover, the additional cost of a DPST switch in the display device drives up cost, which cost may make the display device less attractive to consumers, especially where an attached computer system does not have the capability to have power remotely controlled. Other options for controlling power to both the display device and the computer system include use of a power strip; however, removing power from the computer abruptly and without warning, as is the case by turning off the power strip, may cause computer system errors.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections. In the case of electrical connections, such coupling may be direct, indirect, through an optical connection, or through a wireless electrical connection.

DETAILED DESCRIPTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments were developed in the context of a computer system coupled to a peripheral device being a display device, and where the power button on the display device also controls the computer system. The description of the specification is based on the developmental context; however, the methods and systems are equally applicable to computer systems coupled to any peripheral device, and thus the description based on a peripheral device being a display device should not be used or construed as a limitation as to the scope of the applicability of the various embodiments.

Figure 1:
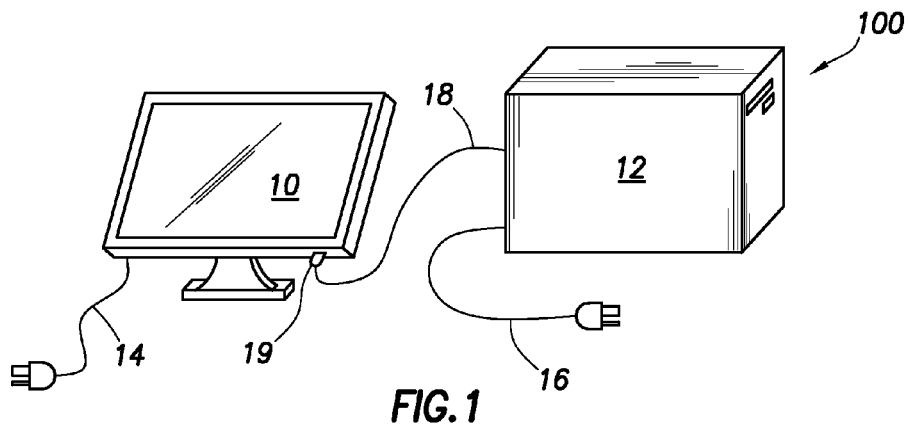
FIG. 1 shows a system in accordance with the various embodiments.

FIG. 1 illustrates a system 100. In particular, system 100 comprises a display device 10 coupled to a computer system 12. In order for power to be supplied to the display device 10, the display device has an internal power supply (see FIG. 2) which draws power from a wall socket connection by way of a power cable 14. Likewise, in order for power to be supplied to the computer system 12, the computer system has an internal power supply (see FIG. 3) which draws power from a wall socket connection by way of a power cable 16. In order for text and graphics to be sent from the computer system 12 to the display device 10, the display device 10 couples to the computer system 12 by a video cable 18. In some embodiments, the video cable 18 has a video graphics array (VGA) cable connector 19 on each end (e.g., a three-row 15 pin DE-15 connector, which may also be referred to as a mini sub D15). In alternative embodiments, other connectors and pin-outs may be equivalently used.

Figure 2:
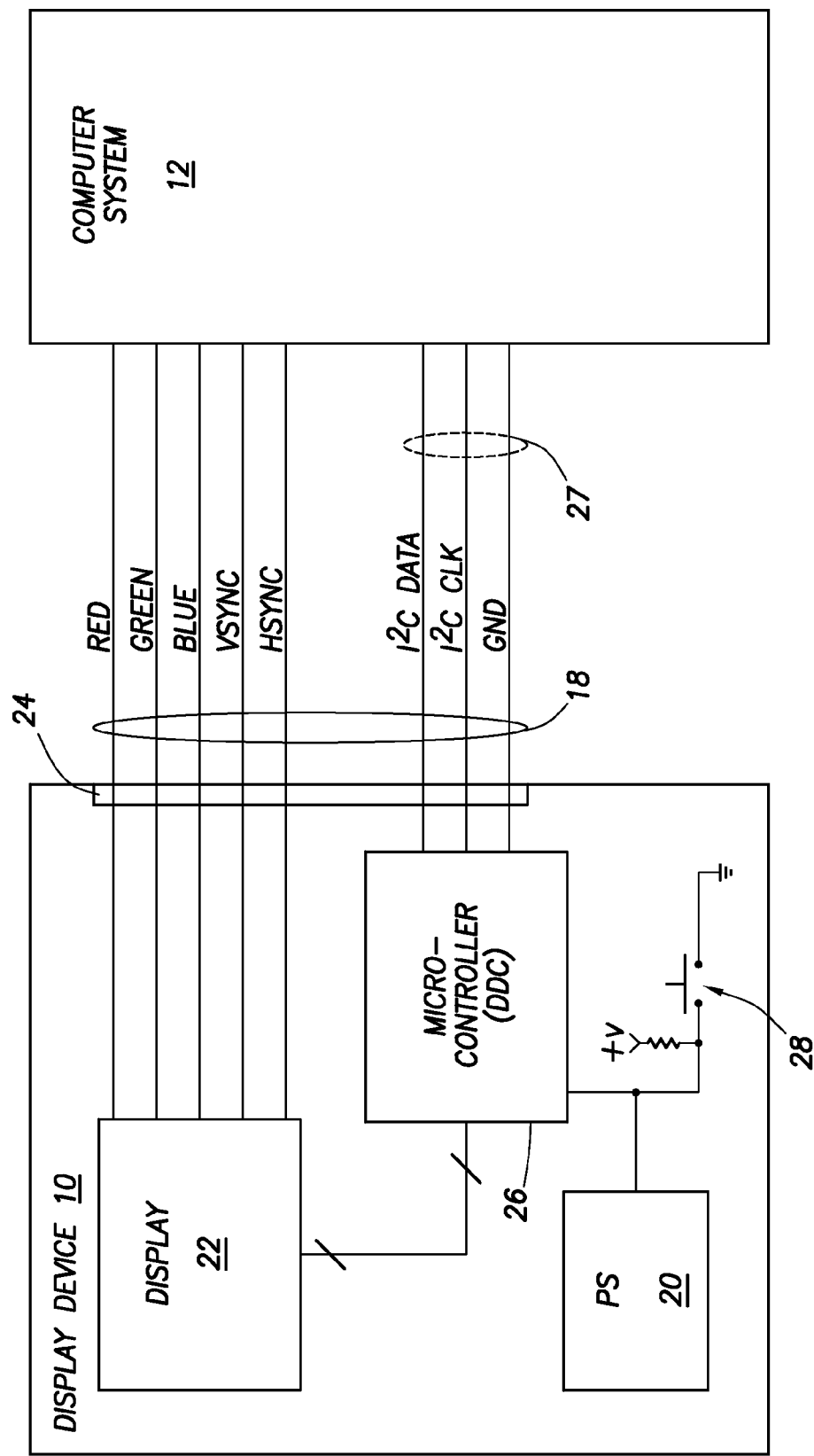
FIG. 2 shows, in block diagram form, a peripheral device coupled to a computer system.

FIG. 2 shows, in block diagram form, the display device 10 and computer system 12, along with a more detailed description of the video cable 18. In particular, the display device 10 comprises a power supply 20 which provides power to various components of the display device. The power connections or power rails between the power supply and the various components are omitted so as not to unduly complicate the figure. The display device 10 also comprises a display 22, upon which text and graphics supplied from the computer system 12 are shown. In some embodiments, the display 22 is an LCD, and in other embodiments, the display is a cathode ray tube (CRT). However, any currently available or after-developed display type may be equivalently used. Video cable 18 couples to the display device 10 by way of a connector 24. In embodiments where the video cable 18 uses male DE-15 connectors, the connector 24 is a female DE-15 connector. In some embodiments the illustrative video cable 18 carries analog video signals (e.g., red, green and blue analog signals, along with horizontal and vertical synchronization pulses). In alternative embodiments, the display device 10 accepts, and the video cable 18 carries, digital video signals.

Still referring to FIG. 2, a display device 10 in accordance with the various embodiments also implements the Video Electronics Standards Association (VESA) Data Display Channel (DDC) system. In particular, the VESA DDC enables the display device 10 to send the display device's specifications (e.g., manufacturer, model number, screen size, or pixel count) to the graphics adapter in the computer system 12 (see FIG. 3). To enable sending VESA DDC information, the display device 10 comprises a processor or microcontroller (hereinafter DDC microcontroller) 26 that couples to a communication bus 27 extending between the display device 10 and the computer system 12 in the video cable 18. In accordance with at least some embodiments, the communication bus 27 is an Inter-integrated Communication ($I^2C$) bus comprising one data line, one clock line and ground line, as illustrated in FIG. 2. Communication over the illustrative $I^2C$ bus uses packet-based messages, where each message has an address portion and a data portion. Thus, when the computer system 12 seeks information regarding the display device 10, a packet-based message is transferred from the computer system 12 to the display device 10 (in particular DDC microcontroller 26) over the communication bus 27. In response, the DDC microcontroller 26 sends one or more packet-based messages from the display device 10 to the computer system 12 containing the requested information.

Display device 10 further comprises a power switch or button 28 coupled to the power supply 20. The power button 28 in some embodiments (and as shown in FIG. 2) is a single pole, single throw switch, meaning that when actuated the two leads of the switch are electrically coupled. The illustrative single pole, single throw switch may be momentary, or the switch may toggle such that a first actuation causes the switch to make, and a second actuation causes the switch to break. In alternative embodiments, the power button 28 is a single pole, double throw switch, meaning that a common lead couples to a first switch lead in a first actuated position, and the common lead couples to a second switch lead in a second actuated position. Regardless of the type switch, when actuated the power button 28 initiates power-related activities of the display device, such as powering-on or powering-off. In some embodiments, the power button couples directly to the power supply 20, and thus the power supply has at least a portion thereof powered, active and sensing actuation of the power button 28. In alternative embodiments, the sensing circuit may be external to the power supply, yet powered by a power rail that remains powered when the remaining portions of the power supply (and computer system) are powered-off.

In accordance with the various embodiments, power button 28 also couples to the DDC microcontroller 26. In response to actuation of the power button 28, the DDC microcontroller 26 is programmed or otherwise configured to send a packet-based message to the computer system 12 over the communication bus 27, the packet-based message indicative of the actuation of the power button 28. The computer system 12, in turn, takes various actions (e.g., powering on or powering off) in response to the packet-based message. In situations where actuation of the power button 28 is a command to power-off the display device 10, the DDC microcontroller 26 sends the packet-based message to the computer system 12 prior to power being removed from the DDC microcontroller 26. In situations where the display device 10 is powered off, the DDC microcontroller 26 may take two possible states. In some embodiments a powered-off display device 10 means that the DDC microcontroller 26 is likewise powered-off, and in these embodiments the DDC microcontroller 26 is configured to send a packet-based message once power is restored. Thus, in such embodiments sensing of the actuation of the power button 28 by the DDC microcontroller 26 is assumed based on the application of power. In alternative embodiments, the DDC microcontroller 26 remains powered in spite of the fact remaining portions of the display device 10 are powered-off (such as by a management power rail), and thus actuation of the power button 28 to command a power-on of the display device may be directly sensed, and the packet-based message sent to the computer system 12 either before or after complete power-on of the display device 10.

Figure 3:
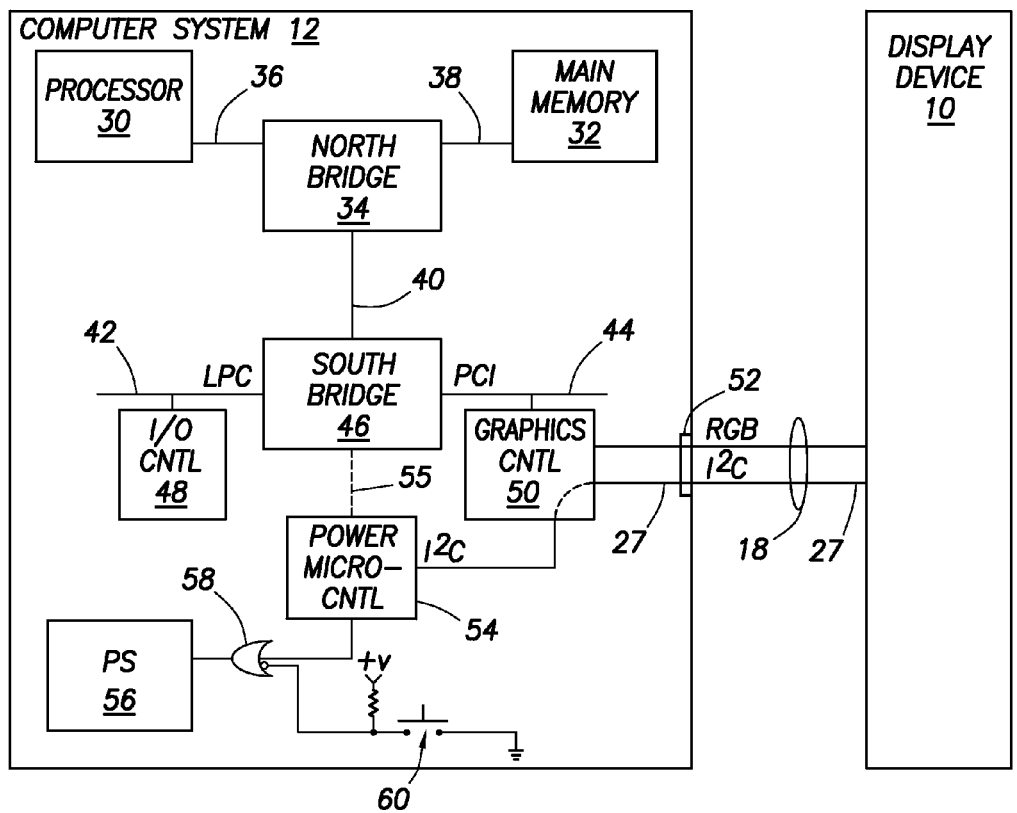
FIG. 3 shows, in block diagram form, a computer system coupled to a peripheral device.

FIG. 3 illustrates, in block diagram form, a computer system 12 in accordance with the various embodiments. In particular, computer system 12 comprises a main processor 30 coupled to a main memory array 32 by way of a bridge device 34, termed a "north bridge" by virtue of its location in computer system drawings. The north bridge 34 has a memory controller that controls transactions to the main memory array 32, and also bridges the processor bus 36 and memory bus 38 to one or more expansion buses, such as a primary expansion bus 40. Although shown as a separate component, in alternative embodiments the north bridge 34 is integral with the processor 30. The illustrative computer system 12 further comprises a second bridge device 46 which bridges the primary expansion bus 40 to various secondary expansion busses (e.g., low pin count (LPC) bus 42 and Peripheral Components Interconnect (PCI) bus 44). The bridge device 46 may be referred to as a south bridge by virtue of its location in computer system drawings.

Various subsystems couple to the secondary expansion buses, such as an input/output (I/O) controller 48 and a graphics controller 50. The I/O controller 48 supports I/O devices, such as a keyboard, mouse, serial ports and floppy drives. The graphics controller 50 receives text and graphics primitives generated by the processor 30, processes the text and graphics primitives, and sends the text and graphics to the display device 10 over the video cable 18. In particular, the graphics controller 50 couples to the video cable 18 by way of a connector 52. In illustrative embodiments where the video cable 18 uses male DE-15 connectors, the connector 52 is a female DE-15 connector.

As discussed above, the video cable 18 not only implements signals for carrying the text and graphics to the display device 10 (e.g., RGB signals), but also a communication bus 27. The communication bus 27 (e.g., $I^2C$ bus) is used not only for DDC-type communications, but also for receiving packet-based messages that indicate actuation of the power button 28 (FIG. 2) on the display device 10. In order to receive and take action on the messages indicating actuation of the power button on the display device, the computer system 12 also comprises a power control processor or microcontroller (hereinafter just power microcontroller) 54 coupled to the communication bus 27. In some embodiments, the power microcontroller 54 is implemented external to the graphics controller 50 (as shown), with the communication bus 27 extended to the reach the power microcontroller 54. In alternative embodiments, the power microcontroller 54 is implemented on the graphic controller 50, or any other suitable location.

In accordance with at least some embodiments, the power microcontroller 54 couples to the power supply 56 by way of a OR gate 58, which logically "ORs" a power command from power microcontroller with the power command generated by illustrative power button 60. Thus, commands to power-on the computer system 12, or power-off the computer system 12, may originate either from the power microcontroller 54 or the power button 60.

In accordance with at least some embodiments, the power microcontroller 54 is configured to monitor the communication bus 27 for packet-based messages indicating actuation of the power button 28 (FIG. 2) on the display device 10. Consider first the situation where both the computer system 12 and display device 10 are operational. When a user actuates the power button 28 (FIG. 2) on the display device 10, the DDC microcontroller 26 (FIG. 2) sends a packet-based message over the communication bus 27 indicating that the display device 10 is powering off. The packet-based message is ultimately received by the power microcontroller 54, which may take one of several possible actions. In some embodiments, the power microcontroller initiates a power-off sequence of the computer system 12 by asserting the control signal coupled to the power supply 56 through logic gate 58. In alternative embodiments, the power microcontroller initiates a reduced power operational mode, such as an Advanced Configuration and Power Interface (ACPI) specification S1, S2, S3 or Hibernate (S4) state. In the alternative embodiments triggering reduced power operational modes, the control signal coupled to the power supply 56 through the logic gate 58 may not be used, and instead the reduced power operational state may be triggered by sending ACPI compliant messages to the processor 30, such as over optional coupling of the power microcontroller 54 to the secondary expansion bus 55. In yet still other embodiments, when the packet-based message is received indicating the user is powering-off the display device 10, the power microcontroller 54 may initiate a log off of the current user, but otherwise leave the computer system 12 operational. In yet still other embodiments, the power microcontroller 54 locks a software terminal session executed on the computer system 12. In yet still other embodiments, the power microcontroller 54 may be configured to take no action.

Now consider the situation where both the computer system 12 and the display device 10 are powered-off. In order to detect a power-on message from the display device, the power microcontroller 54 receives power from a power rail of the power supply 56 that remains powered when other power rails are powered-off, such as a system management power rail. When the power microcontroller 54 receives a message from the display device 10 that the display device is powering-on, the power microcontroller 54 can be configured to power-on the computer system 12, such as by sending a command to the power supply 56 through the logic gate 48. In alternative embodiments, when the power microcontroller 54 receives a message from the display device 10 that the display device is powering-on, the power microcontroller 54 can be configured to wake the computer system from a reduced power operational state. In yet still further alternative embodiments, the power microcontroller 54 may be configured to take no action.

Figure 4:
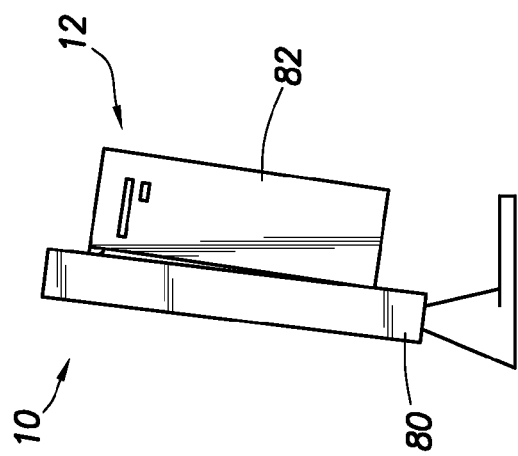
FIG. 4 shows a side elevational view of an illustrative display device and computer system.

The various embodiments thus enable controlling both the powering of the display device 10 and the computer system 12 using only power button 28 on the display device 10. Controlling power for the computer system 12 by way of the power button 28 on the display device 10 is advantageous when the power button 60 on the computer system 12 is difficult to reach (e.g., when the computer system 12 is on the floor, or in a cabinet). Controlling the power state of the computer system 12 by way of the power button 28 on the display device is also advantageous in situations where the computer system is hidden behind the monitor. For example, FIG. 4 shows a side elevational view of system 100 where the computer system 12 is behind the display device 10. In particular, the display device 10 comprises an enclosure 80 housing various electronic devices. Likewise, the computer system 12 comprises an enclosure 82 housing various electronic devices. In these embodiments, the enclosure 82 of the computer system 12 is configured couple to, in this case suspend from, the enclosure 80 of the display device.

Figure 5:
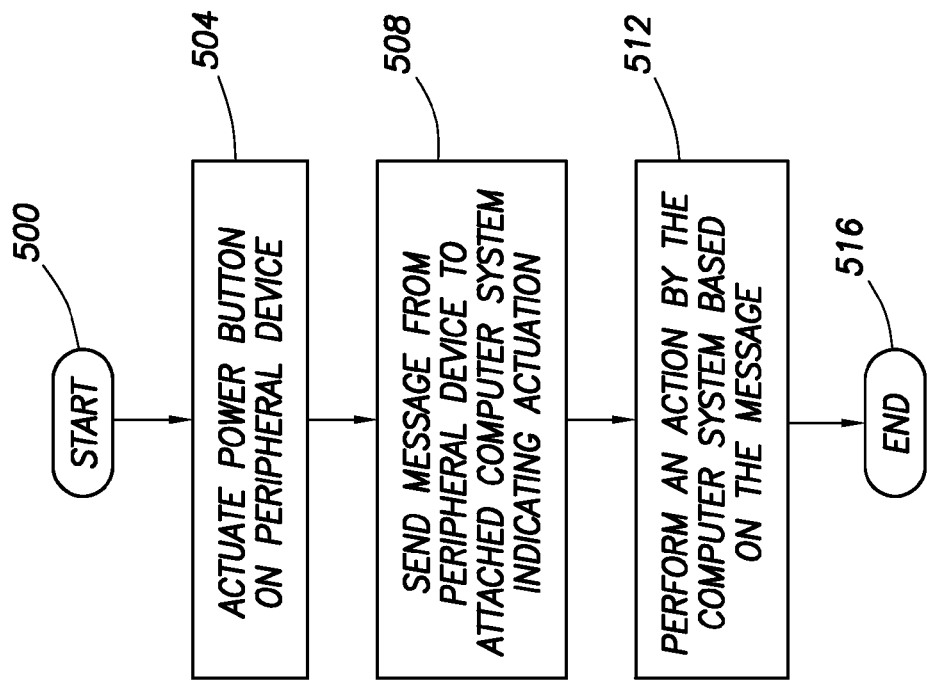
FIG. 5 shows a method in accordance with at least some embodiments.

FIG. 5 illustrates a method in accordance with at least some embodiments. In particular, the method starts (block 500) and proceeds to actuating a power button on a peripheral device (block 504), such as a display device coupled to a computer system. Next, the peripheral device sends a message over a message-based communication pathway to an attached computer system indicating actuation of the power button on the peripheral device (block 508). Thereafter, the computer system takes an action based on the message (block 512) and the illustrative method ends (block 516). The action taken by the computer system could be at least one selected from group consisting of: power-on the computer system; power-off the computer system; wake the computer system from a reduced power operational state; place the computer system in a reduced power operational state; log the current user off the computer system; and lock a software terminal session executing on the computer system.

What is claimed is:

1. A system comprising:
   a computer system comprising:
      a first enclosure;
      a first processor disposed within the first enclosure;
      a second processor disposed within the first enclosure, the second processor coupled to the first processor; and
      a first power supply disposed within the first enclosure, the first power supply coupled to the first processor, the first power supply supplies power to the computer system;
   a peripheral device comprising:
      a second enclosure distinct from the first enclosure;
      a power button associated with the second enclosure; and
      a second power supply disposed within the second enclosure, the second power supply coupled to the power button, the second power supply supplies power to the peripheral device;
   a communication bus comprising an inter-integrated circuit (I²C) communication bus, the I²C communication bus coupling the peripheral device to the computer system;
   wherein when the power button of the peripheral device is actuated, the peripheral device sends a packet-based message across the I²C communication bus to the second processor in the computer system indicating actuation of the power button; and
   responsive to the packet-based message the computer system powers-on.

2. The system as defined in claim 1 wherein the peripheral device is a display device.

3. The system as defined in claim 2 further comprising a video cable coupling the computer system to the display device, and wherein the video cable has conductors dedicated to the communication bus.

4. The system as defined in claim 1 wherein the first enclosure suspends from the second enclosure.

5. A computer system comprising:
   a first outer enclosure;
   a first processor disposed within the first outer enclosure;
   a second processor coupled to the first processor, the second processor disposed within the first outer enclosure;

a power supply coupled to the first processor and disposed within the first outer enclosure; and a communication bus connector accessible through the first outer enclosure, the communication bus comprises an inter-integrated circuit (I²C) communication bus, and the communication bus connector defines electrical pins that couple the computer system to a peripheral device that defines a second outer enclosure distinct from the first outer enclosure, at least some of the electrical pins couple to the second processor and are pins of a serial communication bus;

when the second processor receives across the I²C communication bus an indication that a power button of the peripheral device has been actuated, the second processor logs a current user off the computer system.

6. The computer system as defined in claim 5 wherein the peripheral device is a display device.

7. The computer system as defined in claim 6 further comprising the first outer enclosure configured to suspend from the second outer enclosure of the display device.

8. A method comprising:

actuating a power button of an external peripheral device coupled to a computer system;

sending a packet-based message from the peripheral device to the computer system over a message-based communication pathway indicating actuation of the power button; and locking a software terminal session executing on the computer system based on the packet-based message.

9. The method as defined in claim 8 wherein actuating the power button further comprises actuating the power button on a peripheral device being a display device.

10. A system comprising:

a computer system comprising:
  a first enclosure;
  a first processor disposed within the first enclosure;
  a second processor disposed with the first enclosure, the second processor coupled to the first processor; and
  a first power supply disposed within the first enclosure, the first power supply coupled to the first processor, the first power supply supplies power to the computer system;

a peripheral device comprising:
  a second enclosure distinct from the first enclosure;
  a power button associated with the second enclosure; and
  a second power supply disposed within the second enclosure, the second power supply coupled to the power button, the second power supply supplies power to the peripheral device;

a communication bus coupling the peripheral device to the computer system;

wherein when the power button of the peripheral device is actuated, the peripheral device sends a packet-based message across the communication bus to the second processor indicating actuation of the power button; and responsive to the packet-based message the second processor locks a software terminal session executing on the computer system.

11. The system as defined in claim 10 wherein the peripheral device is a display device.

12. A computer system comprising:

a first outer enclosure;

a first processor disposed within the first outer enclosure;

a second processor coupled to the first processor, the second processor disposed within the first outer enclosure;

a power supply coupled to the first processor and disposed within the first outer enclosure; and a communication bus connector accessible through the first outer enclosure, the communication bus defines electrical pins that couple the computer system to a peripheral device that defines a second outer enclosure distinct from the first outer enclosure, at least some of the electrical pins couple to the second processor and are pins of a serial communication bus;

when the second processor receives an indication that a power button of the peripheral device has been actuated, the second processor locks a software terminal session executing on the first processor.

13. The computer system as defined in claim 12 wherein the peripheral device is a display device.

14. The computer system as defined in claim 12 further comprising the first outer enclosure configured to suspend from the second outer enclosure of the display device.

* * * * *